(12) United States Patent
Matthews

(10) Patent No.: US 12,134,239 B2
(45) Date of Patent: Nov. 5, 2024

(54) PLUG FOR SEALING A PUNCTURE IN A TYRE, KIT THEREFOR, METHOD THEREFOR, AND TYRE COMPRISING THE PLUG

(71) Applicant: Tyre Tuft Pty Ltd, Daisy Hill (AU)

(72) Inventor: Owen Matthews, Daisy Hill (AU)

(73) Assignee: Tyre Tuft Pty Ltd, Daisy Hill (AU)

( * ) Notice: Subject to any disclaimer, the term of this patent is extended or adjusted under 35 U.S.C. 154(b) by 911 days.

(21) Appl. No.: 16/635,203

(22) PCT Filed: Aug. 2, 2018

(86) PCT No.: PCT/AU2018/050806
§ 371 (c)(1),
(2) Date: Jan. 30, 2020

(87) PCT Pub. No.: WO2019/023754
PCT Pub. Date: Feb. 7, 2019

(65) Prior Publication Data
US 2021/0086458 A1  Mar. 25, 2021

(30) Foreign Application Priority Data

Aug. 2, 2017  (AU) .................. 2017903058

(51) Int. Cl.
| B29C 73/06 | (2006.01) |
| B29C 73/00 | (2006.01) |
| B29C 73/16 | (2006.01) |

(52) U.S. Cl.
CPC ........... *B29C 73/06* (2013.01); *B29C 73/163* (2013.01); *Y10T 152/10909* (2015.01)

(58) Field of Classification Search
CPC ..... Y10T 152/10909; Y10T 152/10882; Y10T 152/10891; Y10T 152/109; B29C 73/06; B29C 73/063; B29C 73/066; B29C 73/08; B60C 25/16
USPC ................. 152/370, 367–369; 81/15.5–15.7; 156/97
See application file for complete search history.

(56) References Cited

U.S. PATENT DOCUMENTS

| 733,014 | A | * | 7/1903 | Cox, Jr. | .................. 152/370 |
| 2,125,578 | A | * | 8/1938 | Mullen | ................. 152/370 |
| 2,803,284 | A | * | 8/1957 | Mullen | ............. B29C 73/08 |
| | | | | | 156/97 X |
| 3,035,626 | A | * | 5/1962 | Mullen | ............. B29C 73/08 |
| | | | | | 152/370 |
| 3,049,164 | A | * | 8/1962 | Humphreys | ........... B29C 73/08 |
| | | | | | 156/97 |
| 3,277,642 | A | * | 10/1966 | Niconchuk | ............. B29C 73/06 |
| | | | | | 156/97 |
| 3,342,240 | A | * | 9/1967 | Williams | ............... B29C 73/08 |
| | | | | | 425/11 |
| 3,894,449 | A | * | 7/1975 | Hartley | ................. B29C 73/08 |
| | | | | | 81/15.7 |
| 4,111,867 | A | * | 9/1978 | Komuro | ............... B60C 1/0016 |
| 4,279,343 | A | * | 7/1981 | Alfanta | ................... B29C 73/06 |
| | | | | | 152/370 |
| 4,718,469 | A | | 1/1988 | Koch et al. | |
| 4,923,543 | A | * | 5/1990 | Koch | ...................... C08J 7/126 |
| | | | | | 156/97 |
| 2007/0184742 | A1 | * | 8/2007 | Coulson | .................. B32B 9/02 |
| | | | | | 442/370 |
| 2010/0021513 | A1 | * | 1/2010 | Garois | ................ A61L 15/425 |
| | | | | | 521/50.5 |

FOREIGN PATENT DOCUMENTS

KR  10-2015-0092650 A  *  8/2015  ............. B29C 73/08

OTHER PUBLICATIONS

European Search Report dated Apr. 9, 2021 in application 18 840 287.9.*
English machine translation of KR 10-2015-0092650 A, Aug. 13, 2015.*
J. van Alphen, Rubber Chemicals, ed. C.M. van Turnhout, D. Reidel Publishing Company, Boston, 1973, p. 19.*

* cited by examiner

*Primary Examiner* — Adrienne C. Johnstone
(74) *Attorney, Agent, or Firm* — Jordan IP Law, LLC

(57) ABSTRACT

The present invention is directed to a plug for sealing a puncture in a tyre, whereby the plug comprises a head portion and a tail portion, the head portion comprising: a porous material that comprises open pores and capable of absorbing >0.02 grams of water per gram of porous material; and an accelerant selected from the group consisting of a salt, a polar solvent, an acid, and any combinations thereof, wherein the accelerant is retained in the pores of the porous material and is configured to react on contact with a curable sealant selected from the group consisting of anionic stabilized sealants, steric stabilized sealants and anionic colloidal dispersions thereby reducing curing time of the sealant, and wherein the porous material does not comprise the sealant.

16 Claims, 6 Drawing Sheets

Fig 1

| | pH | Electrolysis | TOTAL SOLIDS % | 6% HCl | 10% H$_2$SO$_4$ | 20% ETIDRONIC | 50% CITRIC | 30% Ca(NO$_3$)$_2$ | 20% Ca(C$_2$H$_5$COO)$_2$ | 30% CaCl$_2$·2H$_2$O | 25% CaCl$_2$·2H$_2$O 20% CITRIC | 30% ZnCl$_2$ | 30% MgCl$_2$ | 30% Al$_2$(SO$_4$)$_3$ | 20% AlCl$_3$ |
|---|---|---|---|---|---|---|---|---|---|---|---|---|---|---|---|
| Conductivity mS/cm | - | | | 614 | 567 | 175 | 87 | 237 | 137 | 560 | 451 | 417 | 299 | 109 | 442 |
| pH | - | | | 0.1 | 0.3 | 1.1 | 0.7 | 3.2 | 7.3 | 4.6 | -0.6 | 4.5 | 5.6 | 1.9 | 0.6 |
| STANS | 9.9 | A | 38 | ++ | ++ | ++ | ++ | ++ | ++ | ++ | ++ | + | ++ | ++ | + |
| TYRE SHOT | 9.3 | A | 34 | ++ | ++ | + | + | ++ | ++ | ++ | ++ | + | + | ++ | + |
| ORANGE SEAL | 8.5 | A | 18 | ++ | ++ | ++ | ++ | ++ | ++ | ++ | ++ | + | + | ++ | ++ |
| SLIME TIRE SEALANT | 8.5 | A | - | + | ++ | + | + | + | + | ++ | ++ | + | + | ++ | ++ |
| CONTINENTAL | 9.2 | A | 26 | ++ | + | ++ | ++ | + | + | + | ++ | + | ++ | ++ | ++ |
| SHIMANO | 7.5 | A | - | + | ++ | + | + | ++ | + | + | ++ | + | + | ++ | ++ |
| EFFETTO MARIPOSA | 9.3 | A | 26 | ++ | ++ | ++ | ++ | ++ | ++ | ++ | ++ | + | ++ | ++ | ++ |
| TUFO | 8.4 | A | 45 | ++ | ++ | ++ | ++ | + | + | ++ | ++ | + | ++ | + | ++ |
| MITAS | 9.9 | A | 36 | ++ | ++ | ++ | ++ | ++ | ++ | ++ | ++ | + | ++ | ++ | ++ |
| NATURAL RUBBER LATEX | 9.2 | - | - | ++ | ++ | ++ | ++ | ++ | ++ | ++ | ++ | + | ++ | + | ++ |
| POLYCHLOROPRENE LATEX | 12.7 | - | - | ++ | ++ | ++ | ++ | ++ | ++ | ++ | ++ | + | ++ | ++ | ++ |
| STYRENE BUTADIENE LATEX | 10.0 | - | - | ++ | ++ | ++ | ++ | ++ | ++ | ++ | ++ | + | ++ | + | ++ |

| | Conductivity mS/cm | pH | Electrolysis | TOTAL SOLIDS % | ACETONE | MeCN | PHENOXY ETHANOL | n-BuOH | IPA | ZnCl₂ H₂O IPA |
|---|---|---|---|---|---|---|---|---|---|---|
| | | – | | | x | x | x | x | x | 97 |
| STANS | 9.9 | | A | 38 | x | x | x | x | x | x |
| ORANGE SEAL | 8.5 | | A | 18 | ++ | + | + | ++ | + | ++ |
| EFFETTO MARIPOSA | 9.3 | | A | 26 | ++ | ++ | + | + | ++ | ++ |
| TUFO | 8.4 | | A | 45 | ++ | ++ | + | ++ | + | ++ |
| MITAS | 9.9 | | A | 36 | ++ | ++ | ++ | ++ | ++ | ++ |
| JOES SUPER SEALANT | 10.0 | | A | 21 | ++ | ++ | + | ++ | + | ++ |

Fig 2

| | DIMENSIONS (H x W) mm | INITIAL WEIGHT (g) | FINAL WEIGHT (g) | WATER LOADING (g) | AVERAGE MATERIAL POROSITY % (B) |
|---|---|---|---|---|---|
| BONDED LEATHER | 1.0x3.0 | 0.0566 | 0.1494 | 0.0928 | 161 |
| | | 0.0793 | 0.2039 | 0.1246 | |
| COTTON TWINE | 2.2 ⊖ | 0.1149 | 0.2742 | 0.1593 | 156 |
| | | 0.1150 | 0.3148 | 0.1998 | |
| MICROFIBRE LEATHER | 1.2x3.0 | 0.0631 | 0.2106 | 0.1475 | 155 |
| | | 0.0885 | 0.1553 | 0.0668 | |
| MICROFIBRE SUEDE | 2.0x2.5 | 0.0757 | 0.1748 | 0.0991 | 133 |
| | | 0.0854 | 0.2015 | 0.1161 | |
| LEATHER | 1.0x3.0 | 0.1764 | 0.2872 | 0.1108 | 62 |
| | | 0.1746 | 0.2817 | 0.1071 | |
| POLYPROPYLENE SHEATHED RUBBER | 4.0 ⊖ | 0.5755 | 0.7238 | 0.1483 | 24 |
| | | 0.7008 | 0.8584 | 0.1576 | |
| FLOCK COATED RUBBER | 2.5 ⊖ | 0.1717 | 0.1970 | 0.0253 | 19 |
| | | 0.1655 | 0.2027 | 0.0372 | |
| PVC/COTTON MESH LAMINATE | 1.3x3.0 | 0.1857 | 0.2125 | 0.0268 | 14 |
| | | 0.1781 | 0.2008 | 0.0227 | |
| PVC/POLYESTER FABRIC | 0.8x3.7 | 0.1607 | 0.1762 | 0.0155 | 11 |
| | | 0.1557 | 0.1753 | 0.0196 | |
| PVC/NYLON MESH LAMINATE | 1.2x3.5 | 0.2064 | 0.2229 | 0.0165 | 8 |
| | | 0.2118 | 0.2268 | 0.015 | |
| PVC/SILK MESH LAMINATE | 1.1x3.1 | 0.1922 | 0.2027 | 0.0105 | 6 |
| | | 0.1745 | 0.1849 | 0.0104 | |
| PVC/POLYPROPYLENE MESH LAMINATE | 1.1x 8.5 | 0.3930 | 0.4047 | 0.0117 | 3 |
| | | 0.4443 | 0.4555 | 0.0112 | |
| PVC/POLYESTER MESH LAMINATE | 1.2x18 | 1.1148 | 1.1329 | 0.0181 | 2 |
| | | 1.0520 | 1.0764 | 0.0244 | |
| BLACKBURN PLUG | ~2.2 ⊖ | 0.1760 | 0.1798 | 0.0038 | 1 |
| | | 0.1687 | 0.1697 | 0.001 | |
| NYLON CORD | 2.0 ⊖ | 0.1656 | 0.1673 | 0.0017 | 1 |
| | | 0.1941 | 0.1969 | 0.0028 | |
| SLIME TIRE PLUG | ~6.0 ⊖ | 1.1249 | 1.1334 | 0.0085 | 1 |
| | | 1.2466 | 1.2537 | 0.0071 | |
| DYNAPLUG | 3.0 ⊖ | 0.5341 | 0.5374 | 0.0033 | 1 |
| | | 0.5411 | 0.5436 | 0.0025 | |
| PANARACER | 1.5x3.0 | 0.2246 | 0.2254 | 0.0008 | 0 |
| | | 0.2278 | 0.2285 | 0.0007 | |
| PVC | 0.85x3.1 | 0.1516 | 0.1516 | 0 | 0 |
| | | 0.1599 | 0.1599 | 0 | |

FIG 3

| PLUG MATERIAL SEALANT | DIMENSIONS (H x W) mm | INITIAL WEIGHT (g) | WET WEIGHT (g) | TOTAL AFTER SEALANT PICK-UP (g) | SEALANT PICKUP MASS (mg) | DIP SURFACE AREA (mm²) | AVERAGE SEALANT PICK-UP mg/mm² | AVERAGE ACCELERANT POROSITY % |
|---|---|---|---|---|---|---|---|---|
| PVC | 0.86x14.6 | 0.7094 | 0.7181 | 0.8055 | 87 | 786 | | |
| TYRE SHOT | 0.86x14.6 | 0.7327 | 0.7418 | 0.8026 | 61 | 786 | 0.09 | 1.2 |
| MICROFIBRE LEATHER | 1.28x13.6 | 0.3972 | 1.1171 | 1.4412 | 324 | 761 | | |
| TYRE SHOT | 1.28x13.6 | 0.4024 | 1.1413 | 1.4434 | 302 | 761 | 0.41 | 182 |
| PVC/NYLON MESH LAMINATE | 1.2x 14.1 | 0.8051 | 0.8665 | 1.1303 | 264 | 784 | | |
| TYRE SHOT | 1.2 x 14.3 | 0.8738 | 0.9227 | 1.1486 | 226 | 792 | 0.31 | 6.6 |
| POLYPROPYLENE SHEATHED | 4 ⊖ | 0.5776 | 0.7384 | 0.9091 | 171 | 327 | | |
| RUBBER | 4 ⊖ | 0.5876 | 0.7389 | 0.883 | 144 | 327 | 0.48 | 26.8 |
| TYRE SHOT | | | | | | | | |
| PANARACER | 1.5x14.5 | 1.0684 | 1.0728 | 1.117 | 44 | 822 | | |
| TYRE SHOT | 1.5x15.3 | 1.1274 | 1.1336 | 1.2149 | 81 | 863 | 0.07 | 0.5 |

| | WATER CONTROL | 30% Ca(NO₃)₂ | 20% Ca(C₂H₅COO)₂ | 30% CaCl₂·2H₂O | 20% ETIDRONIC | 50% CITRIC | 6% HCl | 30% ZnCl₂ | 30% MgCl₂ | 30% Al₂(SO₄)₃ | 20% AlCl₃ | 25% CaCl₂·2H₂O 20% CITRIC | 25% CaCl₂·2H₂O 20% CITRIC NYLON CORD* | 10% H₂SO₄ | ISOPROPANOL WATER ZnCl₂ |
|---|---|---|---|---|---|---|---|---|---|---|---|---|---|---|---|
| STANS | - | ++ | +++ | +++ | +++ | +++ | +++ | ++ | +++ | +++ | +++ | +++ | - | ++ | + |
| TYRE SHOT | - | +++ | +++ | +++ | +++ | +++ | +++ | +++ | + | ++ | ++ | +++ | - | +++ | + |

+++ 30s ++ 60s + 120s – fail >120s; * NON-POROUS (<2%) NYLON CORD PLUG (50mm)

FIG 6

| TWO COMPONENT PLUGS | WATER CONTROL | 25% CaCl₂·2H₂O 20% CITRIC | MESH THICKNESS (mm) | µg water porosity per mm² plug surface area (µg/mm²) |
|---|---|---|---|---|
| FLOCK COATED RUBBER | - | +++ | - | 78 |
| PVC/COTTON MESH LAMINATE | - | +++ | 0.45 | 58 |
| PVC/NYLON MESH LAMINATE | - | +++ | 0.35 | 33 |
| PVC/SILK MESH LAMINATE | - | +++ | 0.3 | 25 |
| PVC/POLYPROPYLENE MESH LAMINATE | - | +++ | 0.20 | 12 |
| PVC/POLYESTER MESH LAMINATE | - | +++ | 0.25 | 11 |

+++ 30s ++ 60s + 120s – fail >120s; Tyre Shot Sealant

| | THICKNESS MM | ABRASION RESISTANCE | FLEXIBILITY (2.5mm cylinder 360° wrap) | TENSILE FORCE (N) | WATER POROSITY % |
|---|---|---|---|---|---|
| MICROFIBRE LEATHER | <1.3 | +++ | PASS | >50 | 155 |
| BONDED LEATHER | <1.3 | +++ | PASS | >50 | 161 |
| LEATHER | <1.0 | +++ | PASS | >50 | 62 |
| PVC/POLYESTER FABRIC | <1.0 | +++ | PASS | >50 | 11 |
| PVC/NYLON MESH LAMINATE | 1.2 | +++ | PASS | >50 | 7.5 |
| FLOCK COATED RUBBER | 2.5 | + | PASS | >35 | 18.6 |
| POLYPROPYLENE SHEATHED RUBBER | 4 | + | PASS | >50 | 24.1 |

FIG 7

PLUG FOR SEALING A PUNCTURE IN A TYRE, KIT THEREFOR, METHOD THEREFOR, AND TYRE COMPRISING THE PLUG

FIELD OF THE INVENTION

The present invention relates to the field of puncture repair. More particularly, the invention relates to a plug for tyre puncture repair.

BACKGROUND TO THE INVENTION

Any reference to background art herein is not to be construed as an admission that such art constitutes common general knowledge in Australia or elsewhere.

The tubeless pneumatic tyre is ubiquitous in modern society and punctures causing deflation are commonplace. The preferred approach to repairing a puncture avoids having to dislodge the tyre from the rim so that the air seal between the bead of the tyre and the rim flange is not broken nor damaged as it might be during removal of the tyre. Many attempts have been made in the art to develop tyre repair that can be used without removing the tyre from the rim.

It is well known in the art to insert a plug which closes the puncture by mechanical sealing wherein the plug is tight fitting such that an air-tight seal is formed over the puncture by an adhesive. This method combines the mechanical sealing aspect with an adhesive component that binds the plug to the tyre.

The plug must have sufficient body to adequately fill the cut or puncture being repaired to effectively make a mechanical seal. Furthermore, the plug must remain fixed in place during tyre inflation and subsequent use. Additionally, for long lasting repair, the plug must resist degradation under environmental conditions.

One common feature of the multitude of materials and methods used to form plugs for tyre puncture repair is that they are all non-porous. In this regard, porous tyre repair plugs are not used because the pores can provide another pathway for pressurized air to escape.

It should be apparent that there is a need for a method of sealing punctured tyres that result in a stronger longer-lasting sealing layer and/or that cures quickly so that the consumer can quickly and effectively seal a puncture. Furthermore, there is a need for a commercial alternative to the presently available solutions.

SUMMARY OF THE INVENTION

In a first form, although it need not be the only or indeed the broadest form, the invention resides in a plug for sealing a puncture in a tyre comprising:
  a porous material that absorbs >0.02 grams of water per gram of porous material; and
  an accelerant selected from the group consisting of a salt, solvent and acid, or a combination thereof impregnated in the porous material,
wherein the accelerant reduces curing time of a sealant selected from the group consisting of anionic stabilized sealants, steric stabilized sealants and anionic colloidal dispersions.

In an embodiment, the porous material is selected from the group consisting of microfibre suede, bonded leather, leather, flock coated rubber, microfibre leather, PVC/polyester fabric, cotton twine, polypropylene sheathed rubber, PVC/cotton mesh laminate, PVC/polypropylene mesh laminate, PVC/polyester mesh laminate, PVC/silk mesh laminate and PVC/nylon mesh laminate.

In one embodiment, the salt comprises a cation selected from the group consisting of hydrogen, sodium, magnesium, calcium, zinc, nitrogen, and aluminium. Preferably, the cation is selected from the group consisting of a calcium, zinc, magnesium, aluminium and hydrogen.

In an embodiment, the salt comprises an anion selected from the group consisting of halide, sulfate, nitrate, phosphate, phosphonate, propionate and carboxylate. Suitably, the anion selected from the group consisting of halide, nitrate, sulfate, propionate, phosphonate and phosphate. Preferably, the anion is a chloride ion.

In a preferred embodiment, the salt is selected from the group consisting of $Ca(NO_3)_2$, $Ca(C_2H_5COO)_2$, $CaCl_2$, $ZnCl_2$, $MgCl_2$, $Al_2(SO_4)_3$, and $AlCl_3$. Preferably, the salt is the form of calcium chloride dihydrate.

In an embodiment, the acid has a pH of less than 7. Suitably, the acid has a pH of less than 5. More suitably, the acid has a pH of less than 4. Preferably, the acid has a pH of less than 3. In one embodiment, the acid may be selected from the group consisting of citric acid, etidronic acid, hydrochloric acid and sulphuric acid.

In one embodiment, the solvent is a polar solvent. Suitably, the solvent is selected from the group consisting of acetone, acetonitrile, n-butanol, and isopropyl alcohol. In one embodiment, the accelerant comprises at least one of a salt, a solvent and an acid.

In another embodiment, the accelerant is present in the form of an accelerant composition. Suitably, the accelerant composition further comprises one or more additives and a diluent. In one embodiment, the accelerant comprises calcium chloride dissolved in a diluent and an acid. Suitably, the accelerant comprises calcium chloride dissolved in water and citric acid.

In one embodiment, the sealant is an anionic latex. In an embodiment, the sealant has a basic pH. Suitably, the sealant has a pH of greater than 7.5. More suitably, the sealant has a pH of greater than 8.0. Preferably, the sealant has a pH of greater than 8.5.

In one embodiment, the sealant is suitably selected from the group consisting of polyisoprene, polychloroprene, polybutadiene, styrene-butadiene, carboxylated styrene-butadiene, acrylonitrile-butadiene, carboxylated nitrile-butadiene, isobutylene-isoprene, polyisoprene-polymethylmethacrylate, polychloroprene latex, natural rubber latex and styrene-butadiene latex. Preferably, the sealant is polychloroprene latex, natural rubber latex, or styrene-butadiene latex and is selected from the group consisting of Stan's™ tire sealant, Tyre Shot® sealant, Orange Seal™ sealant, Slime™ tire sealant, Continental™ sealant, Shimano™ Wheel sealant, Effetto® Mariposa sealant, Tufo® tyre sealant, Mitas™ Tubeless Sealant.

In one embodiment, when the sealant is selected from the group consisting of polychloroprene latex, natural rubber latex and styrene-butadiene latex then the accelerant is selected from the group consisting of $Ca(NO_3)_2$, $Ca(C_2H_5COO)_2$, $CaCl_2$, $HCl$, $ZnCl_2$, $MgCl_2$, $Al_2(SO_4)_3$, $AlCl_3$ and $H_2SO_4$.

In another embodiment, when the sealant is polychloroprene latex, natural rubber latex, or styrene-butadiene latex and is selected from the group consisting of Stan's™ tire sealant, Orange seal™ sealant, Effetto® Mariposa sealant, Tufo® tyre sealant, MitasIM Tubless Sealant and Joe's Super Sealant™ then the accelerant is selected from the group consisting of acetone, acetonitrile, phenoxyethanol, n-butanol, and isopropyl alcohol.

In one embodiment, when the sealant is selected from the group consisting of polychloroprene latex, natural rubber latex and styrene-butadiene latex and is selected from the group consisting of (Stan's™ tire sealant, Tyre Shot® sealant, Orange Seal™ sealant, Slime™ tire sealant, Continental™ sealant, Shimano™ Wheel sealant, Effetto® Mariposa sealant, Tufo® tyre sealant, Mitas™ Tubeless Sealant) then the accelerant is selected from the group consisting of citric acid, etidronic acid, hydrochloric acid and sulphuric acid.

In another embodiment, the sealant is present in the form of a sealant composition. Suitably, the sealant composition comprises the sealant, one or more additives and a diluent.

In one embodiment, the plug comprises a head portion and a tail portion. The head portion formed of, at least in part, porous material. The tail portion is formed of a porous material and/or a non-porous material.

In one embodiment, the head portion comprises at least one projection. Suitably, the at least one projection is formed, at least in part, of porous material. The projections extend away from the head portion. Preferably, the projections extend generally orthogonally from the head portion.

In a preferred embodiment, the tyre is a tubeless tyre.

In a second form, the invention resides in a kit for sealing a puncture in a tyre comprising:
 a plug comprising a porous material that absorbs >0.02 grams of water per gram of porous material;
 an accelerant selected from the group consisting of a salt, solvent and acid, or a combination thereof for impregnating the porous material; and
 a sealant selected from the group consisting of anionic stabilized sealants, steric stabilized sealants and anionic colloidal dispersions;
 wherein the accelerant reduces curing time of the sealant.

The plug, porous material, accelerant, sealant and tyre are as substantially described for the first form.

In an embodiment, the accelerant is impregnated in the porous material of the plug.

In one embodiment, the kit further comprises pressurized gas and/or pump for reinflating the tyre.

In another embodiment, the kit further comprises a tool for inserting the plug.

In an embodiment, the kit further comprises a tool for applying the sealant.

In a third form, the invention resides in a method of sealing a puncture in a tyre including the steps of:
 providing a plug comprising a porous material with an accelerant, that reduces curing time of a sealant, impregnated therein;
 inserting the plug into the puncture; and
 applying a sealant to the puncture,
 to thereby seal the puncture in the tyre,
 wherein the porous material absorbs >0.02 grams of water per gram of porous material,
 wherein the accelerant is selected from the group consisting of a salt, solvent and acid, or a combination thereof, and
 wherein the sealant is selected from the group consisting of anionic stabilized sealants, steric stabilized sealants and anionic colloidal dispersions.

The plug, porous material, accelerant, sealant and tyre are as substantially described for the first and second form.

In one embodiment, the method further includes the step of impregnating the porous material with the accelerant.

In an embodiment, the method further includes the step of re-inflating the tyre.

In a fourth form, the invention resides in a plug when used for sealing a puncture in a tyre, the plug comprising:
 a porous material that absorbs >0.02 g of water per gram of porous material; and
 an accelerant selected from the group consisting of a salt, solvent and acid, or a combination thereof impregnated in the porous material,
 wherein the accelerant reduces curing time of a sealant selected from the group consisting of anionic stabilized sealants, steric stabilized sealants and anionic colloidal dispersions.

The plug, porous material, accelerant, sealant and tyre are as substantially described for the first, second and third form.

The various features and embodiments of the present invention referred to in the individual sections above and in the description which follows apply, as appropriate, to other sections. Consequently, features specified in one section may be combined with features specified in other sections as appropriate.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which:

FIG. 1 shows a table of compatibility between selected accelerants (salts and acids) and sealants;

FIG. 2 shows a table of compatibility between selected accelerants (solvents) and sealants;

FIG. 3 shows a table of plug porosity for certain materials;

FIG. 4 shows sealant pick-up with a sealant and materials with different plug porosity;

FIG. 5 shows a load test with porous microfibre suede in various accelerants and sealants;

FIG. 6 shows a load test with various dual component porous materials; and

FIG. 7 shows technical data on preferred porous material.

DETAILED DESCRIPTION OF THE INVENTION

Embodiments of the present invention reside primarily in a plug. Accordingly, the plug, kit, and method have been described with only those specific details that are necessary for understanding the embodiments of the present invention, so as to not obscure the disclosure with excessive detail that will be readily apparent to those of ordinary skill in the art having the benefit of the present description.

In this specification, adjectives such as at least, one or more, and the like may be used solely to distinguish one element or action from another element or action without necessarily requiring or implying any actual such relationship or order.

Words such as "comprises" or "includes" are intended to define a non-exclusive inclusion, such that a plug, kit, or method that comprises a list of elements does not include only those elements but may include other elements not expressly listed, including elements that are inherent to such an article, kit, and method.

As used herein, the term 'about' means the amount is nominally the number following the term 'about' but the actual amount may vary from this precise number to an unimportant degree.

The present invention is predicated, at least in part, on the finding that a plug comprising a porous material and an accelerant impregnated in the porous material has advantageous properties when sealing a puncture in a tyre. In this regard, a puncture in a tyre can be quickly and easily sealed using a plug comprising a porous material that is impregnated with an accelerant.

As used herein, the terms 'porous', 'porosity' and the like refer to the ability of a material to hold or retain water. In this regard, the 'porous material' may include materials that are inherently able to hold or retain water, or materials that have been modified so that they hold or retain water. One example of this modification is increasing the surface area of the material by means of providing the material as a mesh or providing a surface of the material with irregularities by roughing up a surface of the material. The ability to hold or retain water is measured using the method of Example 2, and is quantified as grams of water absorbed compared to initial weight without water.

The invention resides in a plug for sealing a puncture in a tyre comprising:
  a porous material that absorbs >0.02 grams of water per gram of porous material; and
  an accelerant selected from the group consisting of a salt, solvent and acid, or a combination thereof impregnated in the porous material,
  wherein the accelerant reduces curing time of a sealant selected from the group consisting of anionic stabilized sealants, steric stabilized sealants and anionic colloidal dispersions.

Tyres are typically made of cords embedded in rubber to hold the shape of the tyre by preventing the rubber from stretching in response to internal pressure. Typically, in tyre repair, non-porous plugs are inserted into a puncture and an adhesive is applied over the puncture and plug therein. Once the adhesive has cured, a seal is typically formed over the puncture, and the consumer (e.g., cyclist) has sufficient time to get the tyre replaced. These types of repairs are generally not permanent and are only stop-gap solutions until a replacement tyre can be found.

Prior art methods of sealing tyre punctures can take a significant amount of time to prepare and seal a puncture. Specifically, it can take a significant amount of time for the adhesive to cure (i.e. over 15 minutes). In addition to this, the adhesive may not be satisfactorily bonded to the plug and/or tyre which can lead to the puncture re-opening. Furthermore, prior art methods of sealing tyre punctures require removing the tyre from the rim, locating the puncture and then sealing the puncture. This can lead to breaking the air seal between the bead and the tyre and the rim flange being damaged.

Additionally, the insertion of a plug into a puncture can involve excessive force which may result in damage to the tyre, wheel or rim. Furthermore, the dimension and shape of the prior art plugs are generally not variable and so they are not suitable for punctures of various sizes.

The inventor has found that a plug comprising a porous material alleviates these problems by allowing an accelerant to be held or retained therein. In some embodiments, the porous material allows for the retention of both an accelerant and, subsequently, a sealant. As such, the sealant is exposed to a high localised dose of accelerant to rapidly cover and bind with the plug and surrounding area. As such, a seal formed by the present plug forms faster than prior art sealing methods. The present invention offers a rapid and effective solution to a punctured tyre. The porous material suitably absorbs >0.02, more suitably >0.05, preferably >0.1, more preferably >0.2, and most preferably >0.5 gram(s) of water per gram of porous material. These ranges can independently be combined with an upper range of 10, 5, 2 and 1 gram(s) of water per gram of porous material. In one embodiment, the porous material is an absorbent material. The absorbent material being able to absorb the above amounts.

As previously mentioned, the term 'porous' refers to the ability of a material to hold or retain water, and the 'porous material' may include materials that are inherently able to hold or retain water due to their hydrophilicity or characteristics of the pores within the structure. Many such porous materials are known to those skilled in the art, It will be appreciated that the amount of water held or retained by a material can be increased by increasing the surface area of a material. As such, a material can be modified to increase its surface area such that it holds and retains a greater amount of water. In this regard, an unmodified material that does not hold or retain greater than 0.02 grams of water per gram of porous material may be modified such that it holds and/or retains greater than this amount. For instance, nylon cord (when unmodified) holds less than 0.02 grams of water per gram of material as shown in FIG. 3. However, a PVC nylon composite (PVC/Nylon mesh Laminate—FIG. 3) wherein the nylon is provided as a mesh that is bonded to PVC (which would also be defined as a non-porous material when unmodified) holds and retains 0.075 grams of water per gram of material. It will be appreciated that materials that would be considered non-porous may be modified to hold or retain the above amount of water. In this regard, the materials can be modified to increase the material's ability to hold or retain water. Non-limiting examples of this modification include meshes and materials comprising rough surfaces which are known to those skilled in the art. Alternatively, pores may be introduced to the material to increase its ability to hold or retain water.

The plug is suitably flexible and/or resilient to assist with insertion of the plug into the puncture. The plug has sufficient strength, size and shape to fill the puncture. In the embodiment where the plug has been roughened up, the plug advantageously has a rough textured surface that assists with gripping the walls of the puncture hole. Furthermore, the flexibility, texture and/or mechanical fit allows the plug to remain inserted whilst the tyre is in motion.

The plug may be constructed from a single uniform section of material, or it may be formed of multiple materials. In this regard, the plug may be in the form of laminated layers or as a wrapping on a supportive core. The plug may be constructed of an inner non-porous core and a porous outer layer. In other words, the plug may comprise a composite material. The non-porous core can be made of a substance that is substantially airtight that does not allow liquid or air to pass therethrough. It will be appreciated that the porous outer layer still holds and/or retains accelerant and sealant to form a strong sealant layer. Alternatively, the plug may be substantially formed of only porous material.

The porous material may be bonded with a flexible material of varying thickness to improve the tensile strength. Suitable materials include, but not limited to, polyvinylchloride (PVC), polyurethane, polyamide, neoprene, nylon, rubber, chlorosulfonated polyethylene, polyether-polyurea, polytetrafluoroethylene, ethylene propylene copolymer and silicones. The materials may be laminated, stitch bonded or heat treated to form multi-layer materials, or be in the form of suitable cords which may include a flexible central core with a textile or absorbent cover or coating. Non-limiting examples of the laminates include nylon mesh, polypropylene mesh, polyester mesh, cotton mesh, silk mesh, each of which may be bonded to PVC. In one embodiment, the plug has a breaking strain suitably greater than 10N, more suitably greater than 20N, preferably greater than 35N, and most preferably greater than 50N.

The plug may be formed of man-made and/or natural materials. The plug may be formed of fibres. Fibres typically have a high surface area and can hold or retain water. The plug may be in the form of a flexible sheet, a cord or a textile fabric. These materials may be manufactured from various fibres such as viscose, polypropylene, polyethylene, nylon, polyester, polyamide, polyacrylonitrile, acetate, and polyurethane or blends thereof. The plug may also be formed of fibre forming substances such as collagen, cellulosic polymer, hemicellulose, lignin, polyether, keratin and fibroin. Suitable flexible sheets, cords and textile fabrics include leather, synthetic leather, woven textiles, non-woven textiles or laminates. These materials may include microfibers. A rough textured surface on the plug is preferable to increase the surface area of interaction and to grip with the walls of the puncture hole thereby creating a more satisfactory seal.

In one embodiment, the plug may be in the form of a cord. Suitably, the cord may be a flat sheet or a ribbon, or have a round cross-section. The plug may have a consistent or varying width or radius. The plug may be inserted into the puncture as a single, double, quadruple or multiple ply to ensure a suitable interference fit in the puncture. In other words, the plug may be folded to fit the puncture. The plug may suitably be inserted into the puncture using a variety of tools or methods. The plug may also be any size and/or shape. Furthermore, the plug may be made of a material that is easily deformed or cut to shape. This allows for the plug to be tailored to the shape of the puncture. For instance, when the plug is in the shape of a ribbon or a flat sheet then the plug can simply be cut and/or folded to size and length. In one embodiment, when the plug is in the form of a flat-sheet or a ribbon, the plug has a thickness of suitably between about 0.01 mm and about 10 mm, more suitably between about 0.1 mm and about 6 mm, preferably between about 0.5 mm and about 4 mm, and most preferably between about 0.8 mm and about 2 mm.

Suitably, the porous material is selected from the group consisting of microfibre suede, bonded leather, leather, PVC/polyester fabric, flock coated rubber, microfibre leather, cotton twine, polypropylene sheathed rubber and laminates. Non-limiting examples of laminates include cotton, polypropylene, polyester, silk and nylon laminated with, for example, polyvinylchloride (PVC/cotton mesh laminate, PVC/polypropylene mesh laminate, PVC/polyester mesh laminate, PVC/silk mesh laminate and PVC/nylon mesh laminate). Furthermore, the plug is preferably flexible to ensure a snug fit and move with the flexible tyre during inflation and use, and also to flex around a tool blade and puncture hole during the insertion process.

In one embodiment, the plug comprises a head portion and a tail portion. The head portion is attached to, connected to, or integrally formed with, the tail portion. The head portion is formed, at least in part, of a porous material. The tail portion may be formed of a porous material and/or a non-porous material.

The head portion may be inserted into the puncture such that it is exposed to the internal cavity of the tyre. The tail portion may protrude from the external surface of the tyre. As will be mentioned in more detail hereinafter, the head portion delivers an effective quantity of the accelerant to the internal cavity of the tyre and as such is formed, at least in part, of porous material.

In the embodiment where the plug is in the form of a cord or sheet, the fold (where applicable) in the cord or sheet can be viewed as the head portion and the end of the cord or sheet can be viewed as the tail portion.

The head portion may further comprise at least one projection. The projection(s) assist in anchoring the plug in the puncture. The projections are preferably formed, at least in part, of porous material. In one embodiment, the projections extend away from the head portion. Preferably, the projection(s) extend in a generally orthogonal direction from the head portion. The projection ensures that the plug remains in place during curing of the sealant.

In the embodiment where the plug is a multiple ply cord, the projection(s) may extend orthogonally from the fold of the cord (i.e., the head portion). The projection(s) assist in anchoring the head portion in the puncture. The tail portion extending away from the exterior surface of the tyre may be pulled to exert pressure on the head portion of the plug. This pressure may squeeze the accelerant from the head portion and into contact with the sealant. This reduces the curing time of the sealant. The projection also advantageously assists in providing a more complete seal over the puncture.

As mentioned hereinabove, the tail may be formed of any porous and/or non-porous material. A wide range of materials can be utilized as long as the tail portion can be attached to the head portion. Non-limiting examples of the non-porous material include polyvinylchloride, polyurethane, polyamide, neoprene, nylon, rubber, chlorosulfonated polyethylene, polyether-polyurea, polytetrafluoroethylene, ethylene propylene copolymer and silicones.

The accelerant may be impregnated into the porous material by contacting the porous material with the accelerant or accelerant composition. The accelerant may be impregnated into the porous material by simply submerging the plug in the accelerant and/or an accelerant composition. Other methods of impregnating the plug include wiping, dipping, pouring, spraying, brushing, rolling, scraping or dripping the accelerant onto the surface.

The accelerant reduces the curing time of the sealant which forms a seal over the puncture. As previously mentioned, the porous material of the plug allows for the accelerant to be held or retained therein. Once held or retained, the accelerant facilitates curing of the sealant. In one embodiment, the porous material allows the sealant to be held or retained. This increases the strength of the cured sealant to the plug and thus provides a stronger seal over the puncture. In another embodiment, the plug delivers an effective amount of accelerant to the sealant.

It is postulated that the retention of accelerant by the porous material allows the subsequently cured sealant to adhere to the plug more strongly, and thus results in a stronger seal over the puncture. This increase in seal strength is believed to result in a longer lasting seal over the puncture.

As previously mentioned, the accelerant is a material that reduces the curing time of the sealant. As such, the accelerant must be compatible/reactive with the sealant. The accelerant may be selected from the group consisting of salt, solvent and acid, or combinations thereof.

In one embodiment, the sealant is a latex emulsion. As used herein, the term 'latex' refers to a colloidal dispersion of elastomeric polymer microparticles (oil phase) in an aqueous carrier (water phase). Upon evaporation of the water, the latex emulsion forms a film. It will be appreciated that the microparticles in the latex may be stabilised by electrostatic and steric means. Stabilization is achieved by steric stabilizing agents or anionic stabilizing agents. Destabilisation of the latex may occur if the equilibrium of the latex emulsion is upset and the microparticles coalesce or amalgamate, and the latex subsequently coagulates. This coagulation is not reversible. The latex materials described herein may be mixed with various additives and contain more than one type of latex polymer.

The inventor postulates that destabilization of the sealant, for example by thermal, mechanical, chemical, electrical or evaporative means, results in the reduction in curing time of the sealant. The destabilization of the latex is postulated to lead to the microparticles therein coagulating and thus results in rapid film formation. The accelerant may also be viewed as a coagulant. In this regard, it is postulated that coagulation of the latex leads to formation of a wet gel which results in a bond that holds the plug into the puncture.

It is postulated that anionic stabilized sealants are destabilized by cations. It is postulated that anionic stabilized sealants treated with cationic agents results in the anionic stabilizers associating with the cationic agent, thus leading to coagulation and reducing the curing time of the sealant. As such, it is believed that salts are particularly useful in stabilizing anionic stabilized sealants. Preferably, the salt comprises a bivalent cation or multivalent cation. It is postulated that multivalent cations are particularly effective at destabilizing anionic stabilized sealants. Effective latex destabilization with a salt is most effective when ionic charge is vital for latex stability. The inventor postulates that a cationic stabilized sealant may be treated with an anionic accelerant to cause destabilization in a similar, but opposite, manner.

The salt comprises an anion and a cation. Examples of the cations include, but are not limited to, hydrogen, sodium, magnesium, calcium, zinc, nitrogen, and aluminium. Positively charged functional compounds are also suitable, including biguanide and alkylammonium. Preferably, the cation is a multivalent cation. Preferably, the cation is selected from the group consisting of zinc, calcium, magnesium and aluminium. Preferably, the cation is a calcium cation.

Examples of the anion include, but are not limited to, halide, sulfate, borate, nitrate, phosphate, phosphonate, silicate, thiosulphate, thiocyanate, and carboxylate, or polymers thereof. Preferably, the anion is a halide. More preferably, the anion is a chloride anion. Most preferably, the salt is calcium chloride, such as calcium chloride dihydrate. The accelerant is preferably a low viscosity liquid, formulated as a solution or a suspension. However, it will be appreciated that the accelerant may also be applied as a more viscous semi-solid or in the gas phase. Preferably, the accelerant is a cationic composition. Preferably, the accelerant is an acidic accelerant. Preferably, the accelerant is non-toxic and ready-to-use.

The salt preferably has a conductivity in water of suitably greater than 10, more suitably greater than 75, even more suitably greater than 175; preferably greater than 200; and most preferably greater than 300 mS/cm.

In one embodiment, when the sealant is selected from the group consisting of Stans tire sealant, Tyre Shot sealant, Orange Seal sealant, Slime tire sealant, Continental sealant, Shimano sealant, Effetto Mariposa sealant, Tufo sealant, Mitas tyre sealant, polychloroprene latex, natural rubber latex and styrene-butadiene latex then the accelerant is selected from the group consisting of $Ca(NO_3)_2$ (calcium nitrate), $Ca(C_2H_5COO)_2$ (calcium propionate), $CaCl_2$ (calcium chloride), HCl (hydrochloric acid), $ZnCl_2$ (zinc chloride), $MgCl_2$ (magnesium chloride), $Al_2(SO_4)_3$ (aluminum sulphate), $AlCl_3$ (aluminum chloride), and $H_2SO_4$ (sulphuric acid).

Steric stabilization is a mechanism that can explain the ability of some additives to inhibit coagulation of dispersions. Sterically stabilized latex emulsions tend to remain well dispersed due to the presence of steric stabilizers. The inventor believes that the treatment of sterically stabilized sealants with solvent removes the additives from the surface of the microparticles and allows the microparticles to coagulate, and thus reduce the curing time of the sealant. In this regard, it is believed that the steric stabilizing agent will preferentially dissolve in the solvent. Preferably, the solvent is a polar solvent. In one embodiment, the solvent is selected from the group consisting of alcohol, amides, ethers, nitriles, ketones, esters and carboxylic acids.

In an embodiment, when the sealant is selected from the group consisting of Stans tire sealant, Orange seal sealant, Effetto Mariposa sealant, Tufo sealant, Mitas tyre sealant and Joes Super Sealant then the accelerant is selected from the group consisting of acetone, acetonitrile, phenoxyethanol, n-butanol, and isopropyl alcohol.

Treating an anionic colloid dispersion with an acid will lower the pH of the dispersion. The lowering of the pH is believed to lead to the destabilization of the latex dispersion and this leads to a reduction in curing time of the sealant. It will be appreciated that any acid that is capable of lowering the pH of the latex or sealant can be used. In an embodiment, the acid has a pH of suitably less than 7, more suitably less than 5, preferably less than 4, and most preferably less than 3. Preferably, the acid is in the form of an aqueous acid. The latex dispersion may suitable be an anionic colloid dispersion. The pH of the sealant is suitably greater than 7, more suitably greater than 7.5, preferably greater than 8, and most preferably greater than 8.5. Non-limiting examples of the acid include hydrochloric, nitric, citric, sulphuric, formic, boric, glyoxylic, acetic, etidronic and phosphoric acid. Suitably, the acid is selected from the group consisting of citric acid, etidronic acid, hydrochloric acid and sulphuric acid. Preferably, the acid is citric acid.

In one embodiment, when the sealant is selected from the group consisting of Stans tire sealant, Tyre Shot sealant, Orange Seal sealant, Slime tire sealant, Continental sealant, Shimano sealant, Effetto Mariposa sealant, Tufo sealant, Mitas tyre sealant, polychloroprene latex, natural rubber latex and styrene-butadiene latex then the accelerant is selected from the group consisting of citric acid, etidronic acid, hydrochloric acid and sulphuric acid.

In one embodiment, the accelerant comprises at least one of a salt, a solvent and an acid. It is postulated that an accelerant that comprises one or more of the above components is suitable for use with a number of commercially available sealants. For instance, it is postulated that an accelerant that comprises calcium chloride and citric acid can be used to reduce the curing time of both an anionic stabilized sealant and an anionic colloidal dispersion. In this regard, it will be appreciated that a sealant may be stabilized by more than one means. As such, a sealant that is stabilized by multiple means can be destabilized by more than one accelerant. This results in the curing time being reduced by more than one of a salt, an acid and a solvent.

The accelerant may be in the form of an accelerant composition that further comprises one or more additives. Non-limiting examples of the additive include stabilisers, thickeners, emulsifiers, antioxidants, accelerators, activators, sulfur donors, humectants, antifreeze agents, adhesion promoters, viscosity modifiers, boosters, vulcanization promoters, cross linking agents, diluents and/or preservatives. It will be appreciated that these additives improve the properties of the accelerant. The accelerant composition can be applied to the porous material of the plug to impregnate it. As previously mentioned, one such method is to submerge the plug into the accelerant composition or accelerant. A diluent can be used to assist in impregnating the accelerant into the porous material. This diluent is preferably selected from the group consisting of water, alcohols, glycols, carbonates, amides, esters and ethers, or mixtures thereof.

The salt may be present in the accelerant composition in an amount suitably between about 1% and about 90%, more suitably between about 10% and about 50%, preferably between about 20% and about 40%, and most preferably about 20% or 30%. In one embodiment, the accelerant composition comprises calcium chloride dihydrate in an amount of 25% and citric acid in an amount of about 20%, by weight of the accelerant composition.

The sealant is a reagent that is used to seal a puncture such that the puncture is substantially airtight. The sealant may suitably comprise natural or synthetic components. The sealant is suitably a latex emulsion. The sealant may be a commercially available sealant. In one embodiment, the sealant is suitably selected from the group consisting of polyisoprene, polychloroprene, polybutadiene, styrene-butadiene, carboxylated styrene-butadiene, acrylonitrile-butadiene, carboxylated nitrile-butadiene, isobutylene-isoprene, polyisoprene-polymethylmethacrylate, Stans tire sealant, Tyre Shot sealant, Orange Seal sealant, Slime tire sealant, Continental sealant, Shimano sealant, Effetto Mariposa sealant, Tufo sealant, Mitas tyre sealant, polychloroprene latex, natural rubber latex and styrene-butadiene latex. Preferably, the sealant is selected from the group consisting of Stans tire sealant, Tyre Shot sealant, Orange Seal sealant, Slime tire sealant, Continental sealant, Shimano sealant, Effetto Mariposa sealant, Tufo sealant, Mitas tyre sealant and natural rubber latex.

The sealant may be in the form of a sealant composition that comprises the sealant, one or more additives and a diluent. The additives include, but are not limited to, antifreeze agents, aggregates, tackifiers, fillers, adhesion promoters, surfactants, stabilisers, elastomers, thickeners, accelerators, activators, sulfur donors, boosters, vulcanization promoters, cross linking agents, emulsifiers, diluents and/or preservatives. Preferably, the sealant has a solid content of greater than 5%, greater than 10%, and preferably greater than 15%, total solids. Preferably, the sealant contains stabilized microparticles with a negative surface charge. The sealant composition is applied such that it comes into contact with the accelerant to reduce its curing time. The sealant may incorporate a solid that is dissolved or suspended in the diluent.

The diluent in the sealant composition is preferably selected from the group consisting of water and alcohols. The sealant may be delivered as an aerosol which is injected into the tyre to simultaneously inflate and repair the puncture.

The pH of the sealant or sealant composition is suitably greater than 7, more suitably greater than 7.5, preferably greater than 8, and most preferably greater than 8.5.

Sufficient sealant should be applied to cover the accelerant impregnated plug during the sealing process to ensure that an air-tight coating is formed. As such, the cured sealant layer completely covers the puncture and plug to prevent leakage of air from the tyre. The sealant may be added to the interior of the tyre so that a seal is formed on the interior surface of the punctured tyre. In this regard, the sealant can be added by removing the valve core from the tyre valve and adding the sealant therethrough, and ensuring that the sealant flows towards the puncture. The sealant may also be added into the tyre directed through the puncture. Furthermore, the sealant can be loaded into the tyre before insertion of the plug, or before mounting the tyre onto the rim. Suitable coating materials may also be added to the exterior of the tyre to cover the puncture and plug to provide a secondary seal that prevents air from leaking into the atmosphere or environmental influence on the plug.

During inflation, the pressure increases inside the tyre and the sealant can be forced into the plug and surrounding puncture cavities. It will be appreciated that the sealant can penetrate further into the plug to interact with the accelerant therein. As such, a more effective seal/bond is formed.

It is well known that a tubeless tyre must seat tightly into the rim in normal use to prevent air leaks. It is particularly disadvantageous to break this seat during tubeless tyre repair in remote locations with limited equipment because it can be difficult to effectively re-seat the tyre into the rim after repair. For example, if the tyre has stretched over time, or the rim seat and tyre bead are contaminated with residual sealant residue or environmental debris such as grass or stones then it may be difficult to reseat the tyre into the rim. One advantage of the present invention is that the repair can be completed without removal of the tyre from the rim. As such, the risk of damaging the rim flange and wheel is alleviated. This also reduces the total amount of time required to repair a puncture. This is advantageous as the consumer can quickly and easily repair a tyre puncture. Furthermore, sealing a puncture using the present invention suitably takes less than 10 minutes, more suitably less than 5 minutes, and preferably less than 3 minutes. This represents a significant advantage over the prior art plugs currently available in the art.

It will be appreciated that the plug is used in conjunction with an accelerant, and a sealant to seal a puncture. As such, the invention also resides in a kit for sealing a puncture in a tyre comprising:
  a plug comprising a porous material that absorbs >0.02 grams of water per gram of porous material;
  an accelerant selected from the group consisting of a salt, solvent and acid for impregnating the porous material; and
  a sealant selected from the group consisting of anionic stabilized sealants, steric stabilized sealants and anionic colloidal dispersions;
  wherein the accelerant reduces curing time of the sealant.

The plug, porous material, accelerant and sealant are as substantially described hereinabove.

The kit can be provided such that a puncture in a tyre can be sealed once the puncture has been noticed. The consumer can carry the kit so that they have the required tools to seal a puncture immediately.

It will be appreciated that the accelerant is impregnated in the porous material. In this regard, the kit contains a plug comprising a porous material, and an accelerant impregnated in the porous material. In other words, the plug can be pre-impregnated with the accelerant. Alternatively, the plug comprising the porous material and accelerant can be provided separately, and impregnation can occur before the sealing of the puncture. In another embodiment, the porous plug may comprise dry accelerant which may optionally be rehydrated prior to use.

The kit may further comprise pressurized gas and/or a pump. The pressurized gas may be in the form of a pressurized gas canister with pressurized gas therein. The pressurized gas can be used to reinflate the tyre. The pressurized gas and/or pump can be used to inflate the tyre before the sealant material has cured. In this regard, it is postulated that the inflation of the tyre, whilst the sealant is still flowable, may push the sealant into the porous material and the tyre to form a stronger seal. The pressure at which the tyre is inflated to push the sealant into the pores of the porous material and the tyre depends on the type of tyre, and is suitably between about 2 psi and 120 psi, more suitably between about 10 psi and 90 psi. It will be appreciated that any gas can be used to inflate the tyre. Preferably, the gas is selected from the group consisting of air, carbon dioxide, oxygen, nitrogen, helium, and argon. The operating pressure at which the tyre may then be inflated is dependent on the type of tyre and suitably between about 5 psi and about 120 psi, and more suitably between about 10 psi and about 90 psi.

The kit may further comprise a tool for inserting the plug into the puncture. The tool may be selected from the group consisting of screwdrivers, hex keys and awls. Suitably, the tool is a flat metal sheet, a blade, a spatula, an awl, or a similar tool thereof. The tool is preferably a blade with suitable dimensions to push the plug into a puncture. The preferred width of the blade is less than the diameter of the puncture. Suitably, the blade is greater than 0.05 mm thick with a length of at least 5 mm. Preferably, the tool has a handle. The blade may be made of any sufficiently rigid material, such as metal, plastic or carbon fibre. A flat bladed screwdriver is a suitable tool. The tool may also incorporate a sharp edge to trim excess plug material after insertion. The tool is suitably a multi-tool comprising blades and suitable cutting implements.

The kit may further comprise a tool for applying the sealant. The tool for applying the sealant can suitably be a tube, or a suitable attachment that connects and delivers sealant into the valve or tyre, such as a syringe or a pressurized canister with a connector or a spray.

It will be appreciated that the kit may suitably comprise more than one plug. In some embodiments, the kit may suitably comprise more than one accelerant. Furthermore, the kit may suitably comprise more than one sealant. In this regard, it will be appreciated that the kit can be used to seal multiple punctures.

The invention also resides in a method of sealing a puncture in a tyre including the steps of:
 providing a plug comprising a porous material with an accelerant, that reduces curing time of a sealant, impregnated therein;
 inserting the plug into the puncture; and
 applying a sealant to the puncture,
 to thereby seal the puncture in the tyre,
 wherein the porous material absorbs >0.02 grams of water per gram of porous material,
 wherein the accelerant is selected from the group consisting of a salt, solvent and acid, or a combination thereof, and
 wherein the sealant is selected from the group consisting of anionic stabilized sealants, steric stabilized sealants and anionic colloidal dispersions.

The plug, porous material, accelerant and sealant are as substantially described hereinabove.

The method further includes the step of impregnating the porous material with the accelerant. The consumer can impregnate the porous material with the accelerant just prior to sealing a puncture in a tyre. Alternatively, it will be appreciated that the porous material may be pre-impregnated with the accelerant. In another embodiment, the porous plug may comprise dry accelerant which may optionally be rehydrated prior to use.

As previously mentioned, the tyre can be inflated before the sealant is cured. As such, it will be appreciated that the method can further include the step of inflating the tyre.

The tyre is suitably any tyre. In one embodiment, the tyre is a tubeless tyre. In another embodiment, the tyre is a pneumatic tyre. In an embodiment, the tyre is suitably a lighter and thinner type of tyre. Non-limiting examples of the tyre include motorcycle tyres, scooter tyres, skateboard tyres, all-terrain vehicle tyres, cart tyres, bicycle tyres, wheelbarrow tyres and trailer tyres. It will be appreciated that the present invention can be used to seal punctures in a number of tyres, including larger and heavier tyres. Non-limiting examples of the tyres include automobile tyres such as car tyres and truck tyres. It will be appreciated that the lists provided merely exemplify the types of tyres that the present invention can be applied, and that other types of tyres not specifically exemplified can be used with the present invention.

In a fourth form, the invention resides in a plug when used for sealing a puncture in a tyre, the plug comprising:
 a porous material that absorbs >0.02 g of water per gram of porous material; and
 an accelerant selected from the group consisting of a salt, solvent and acid, or a combination thereof impregnated in the porous material,
 wherein the accelerant reduces curing time of a sealant selected from the group consisting of anionic stabilized sealants, steric stabilized sealants and anionic colloidal dispersions.

The plug, porous material, accelerant, tyre and sealant are as substantially described hereinabove.

EXPERIMENTAL

Test Apparatus and Method

In order to test the present invention, a puncture of a preferred size and shape was made in a tyre section from the exterior using a variety of tools of different shapes and sizes, such as a drill, punch, chisel, nail, knife or the like.

Method of Inserting Plug into a Puncture

A flat blade with a blunt end, such as a flat 4 mm screwdriver blade, was used to insert a plug into the puncture. In the instance that the plug is a 2-ply plug, the plug material was folded in half and the end of the flat blade placed into the hinge line of the fold. The blade and the folded 2-ply loop of plug thread were pushed through the puncture for a sufficient distance. The blade was then freely withdrawn by pulling back through the tyre section. A 2-ply loop of the plug remains on the inside face of the tyre section (the head portion) and the 2 externally protruding threads of plug material (the tail portion) can be snipped off flush with the tread of the tyre. In a similar manner a single ply plug can be inserted by folding the plug material at around one quarter the way along its length. The flat blade of the tool is then used to insert into the puncture hole until only a single ply tail resides within the tyre wall. Once fully inserted the blade is withdrawn freely to leave a single ply plug through the tyre, with approximately half of its length on the external face and half on the internal face. A similar method can be used to insert a multiple-ply plug into a puncture. More than one porous plug can be inserted into a puncture hole.

Apparatus for Testing

A 38 mm diameter circular section with a thickness of approximately 1 mm was cut out of a suitable tyre sidewall. It was mounted in a threaded cap which has a 24 mm hole cut from the centre such that the external face of the tyre section faces outwards through the hole and the internal face of the tyre is seated under the threads of the cap. A 38 mm diameter silicone rubber washer that was 2 mm thick was placed on top of the circular tyre section with the flat face of the silicone washer flush against the tyre. The silicone washer had an 18 mm diameter hole through its centre and 5 mm raised silicone walls formed a cylinder around this hole. The silicone cylinder protruded above the tyre circle adjacent to the cap threads. It was consequently closed at one end by the tyre section and open at the other end. The silicone washer fitted snugly into the threaded cap. The volume formed by the cylindrical wall section against the face of the tyre was approximately 2 ml. The threaded cap with the silicone washer and tyre section are screwed onto a plastic threaded bottle neck. This holds the tyre section and the silicone washer in place to form a water tight sealed open top cylinder. The plastic bottle has had the base removed and the 2 ml silicone and rubber sealed cylinder therein is readily accessible.

Apparatus and Method for Testing Flexibility and Tensile Force

Dry plug material of 50 mm in length were provided. Flexibility was tested with a 2.5 mm diameter metal rod which was placed crosswise halfway along the dry material. The plug material was then wrapped once completely around the rod such that the two adjacent sides of the test material butted against each other and looped completely around the rod. Each end of the wrapped plug material was gently pulled apart along a plane 180° to each other and a pass was recorded if the 360° loop of material was able to completely contact the full circumference of the metal rod. Tensile force was measured by clamping one end of the 50 mm length of plug material to a 5.1 kg or a 3.6 kg mass. The unclamped plug was clamped and lifted gently by 10 mm such that the entire mass was suspended between the two clamps. A pass was recorded if the dry plug material withstood the 50N (or 35N) force for >10 seconds without breaking. The results of these tests are shown in FIG. 7.

Example 1: Compatibility Testing of Sealants and Accelerants

Various accelerant compositions were prepared using materials readily available from suppliers including Sigma-Aldrich and Labtek. The pH (TPS Aqua-pH) and conductivity (Hanna Instruments H198312) of the accelerant compositions were measured. The % of total solids (~4 g sample evaporated in oven for 3 h at 105° C.) and the colloidal charge of the sealant were also measured by electrodeposition (modified ASTM D244). Approximately 1.5 ml of each accelerant composition was placed into a round plastic dish. A single drop of a sealant was placed on each accelerant composition and after 5 seconds the mixture was stirred gently. The results were recorded as:
(++) immediate coagulation and the sealant remained in a single agglomerate;
(+) some coagulation but not complete;
(−) no obvious reaction and sealant dispersed in sample as per control (water).

The results of these tests are shown in FIGS. 1 and 2. The results indicate that various acid, solvent and electrolyte accelerants react rapidly with many commercially available latex sealants with a pH of greater than 7 as well as natural rubber latex, polychloroprene latex, styrene butadiene rubber latex. The results indicate that the tested sealants were reactive to either salt, acid and/or solvent.

Example 2: Porosity Testing of Plug Materials

Various porous and non-porous materials were tested to determine their porosity. The materials were cut in approximately 50 mm lengths, and the cross-section dimension and initial weight were measured. The materials were then submerged (in duplicate) in water for at least 30 min, removed, shaken and the surface wiped with a dry cloth to remove surface liquid and the wet-weight recorded. The porosity (average) was calculated as % increase above initial weight. The results of these tests are provided in FIG. 3. It should be evident that various materials including leather, microfibre leather and bonded leather absorb >2% w/w of liquid whereas conventional tyre repair plugs such as Blackburn, Panaracer, Slime and Dynaplug absorb <2% w/w.

Example 3: Sealant Pick-Up Testing

Five exemplary materials were tested to determine the amount of accelerant absorbed, and the amount of sealant picked up subsequently. Porous (microfibre leather and PVC/nylon laminate, polypropylene sheathed rubber) and non-porous (PVC, Panaracer) materials were tested. The material (in duplicate) was measured, weighed and then submerged in accelerant ($CaCl_2$)/citric acid) for an hour and then removed, the surface wiped with a dry cloth to remove excess liquid and the wet-weight recorded. The porosity (average) was calculated as % increase above initial. The material comprising accelerant was then dipped 25 mm deep into a sealant composition (Tyre Shot) for 30 seconds and then removed, shaken dry and the weight recorded again. The dipped surface area of the plug was calculated ($mm^2$) and the amount of sealant pick-up (mg) was also calculated to be expressed as sealant Pick-up ($mg/mm^2$). The results of these tests are shown in FIG. 4. It should be evident by the greater amount of sealant picked up that a reactive latex sealant with a pH of greater than 7.5 forms a substantial wet-gel over a porous material impregnated with an accelerant. However, this was not observed when a non-porous plug material was utilized under comparable conditions. This demonstrates the importance of plug porosity for accelerant-sealant reaction.

Example 4: Load Test with Porous and Non-Porous Plug Types, Two Types of Accelerant and Four Types of Sealant A length of porous microfiber suede 50 mm in length and 2 mm×2.5 mm in cross section was placed in an accelerant composition for a period of at least 20 minutes. Using the test apparatus described above, a puncture was created by drilling a hole through the tyre section using a 3.5 mm drill bit. The impregnated plug was inserted as a single thread into the puncture in a manner as described above. A 2 ml aliquot of a sealant was placed into the open top cylinder cavity of the test apparatus as described above. After 30 seconds of contact time between the sealant, tyre and impregnated plug, a 100 g mass was attached to the plug (the tail) protruding from the lower external surface of the tyre section and the entire testing apparatus was slowly raised against gravity thereby applying a force on the plug of approximately 1N. If, after 30 seconds of contact time, the porous plug, accelerant and sealant could combine to withstand this force for at least 10 seconds without the plug moving, then it was recorded as a (+++). If the plug moved under this force the weight was removed and the timing continued. This 1N load procedure was repeated at 60 sec and if the force was held it was recorded as (++). If the plug moved slightly then the test was repeated again at 120 seconds and a pass recorded as (+). If the 1N was not suspended at 120 seconds it was recorded as a fail (−). This test provides an indication of the compatibility of the plug material, accelerant and sealant. However, it is important to note that this is a rapid screening test method and a fail at 120 seconds does not indicate that the combination of accelerant, plug and sealant tested would not create an effective puncture repair. The results of these experiments are shown in FIG. 5. It should apparent that the qualitative assessment and rating of coagulation and destabilisation of latex emulsions with ionic accelerants in Example 1 appears to correlate well with the same combination forming an effective load bearing seal in the puncture hole. It should be evident that the combination of a plug comprising a porous material, accelerant and a variety of sealants are effective in forming a seal around the puncture.

An additional load bearing test similar to that described above was completed using plugs made from two components, including flock coated rubber, PVC/nylon mesh, PVC/polypropylene mesh, PVC/polyester mesh, PVC/cotton and PVC/silk composite materials with an accelerant composition and control to show the effectiveness of these combinations at low accelerant loadings on low porosity surface modified materials. These composite plug materials were prepared by using adhesive (SikaFlex) to bond the porous mesh coatings of various thickness onto the non-porous PVC base layer. These results are shown in FIG. 6. It should be evident that very low amounts of accelerant per $mm^2$ of external plug surface area could be utilized and still form a strong seal. Please note that these composite materials comprise coatings which increase the amount of water absorbed, and thus their porosity.

Example 5

Various porous materials (22×3×1 mm) were folded in half and placed into a flexible plastic sleeve. The plugs were impregnated with accelerant, A 26×2.25 Maxxis Ardent EXO TR tyre was mounted on a tubeless wheel and 60 ml Stans Tire Sealant added to the internal cavity of the tyre. The tyre was inflated to 28 psi and stabilized using the standard method. Three 5 mm cuts were made in the tread of the inflated tyre and the tyre deflated. One accelerant impregnated plug of each variant (bonded leather, microfibre leather and leather) was inserted into each puncture using a tool. The wheel was rotated for 30 sec and then inflated to 28 psi. The wheel was mounted on a bike and ridden on mixed terrain for 30 min. The pressure remained at 28 psi. The tyre was submerged in a water bath and no air leaks were apparent through the repaired puncture. The tyre remained inflated and was ridden on regular occasions over a period of 3 weeks, thereby demonstrating a suitable repair.

Example 6

The method of Example 5 was repeated with the exception that a non-porous PVC plug (22×3×1 mm) was submerged in accelerant and then inserted into a 5 mm cut in tyre. As the tyre was inflated with air, a leak was observed (particularly at higher pressures). It should be apparent that the non-porous PVC plug resulted in an ineffective repair.

In order to show the superior properties of the porous material/plug, the non-porous and ineffective PVC plug was removed and replaced with a porous plug as described in Example 5. The tyre was inflated to riding pressure and was ridden on regular occasions over a period of 3 weeks, thereby demonstrating a suitable repair.

Example 7—Working Examples

Porous plugs were prepared in a manner similar to the above and carried in a kit (tool, plugs, pump, and Tyre Shot sealant) by an experienced mountain bike rider. The rider prepared the tyres with 60 ml of Tyre Shot sealant. After riding for 44 h (19 days, 750 km), the rider punctured through the rear tread of the 29×2.25 Thunder Burt (Schwalbe) whilst riding. The rider used the tool to insert a plug into the puncture hole and then added the Tyre Shot sealant. Within 5 minutes the rider re-inflated the tyre using a hand pump and continued riding. The next day the rider punctured the same tyre, and two holes were found—one on the rim/bead and one in the tread. A plug was inserted into each puncture. The rider re-inflated the tyre and continued riding. After seven days, the rider punctured the same tyre and found two holes (rim and tread). Plugs were inserted into the tread and the rim cut. The rider re-inflated and continued riding. Since the first puncture repair, the rider rode for 81 h (1534 km) over a timeframe of 62 days and had 5 repair plugs in the tyre before the tyre tread was worn out and the tyre replaced. This demonstrates the longevity and strength of using the plug comprising a porous material.

Example 8—Working Example

Porous plugs were prepared in a manner similar to above and carried in a kit (tool, plugs, $CO_2$ canister, and Tyre Shot sealant) by an experienced road cyclist. The rider prepared both Pro 1 (Schwalbe) 700C tyres with 60 ml of Tyre Shot sealant each and inflated the tyres to 90 psi. After riding for 4 weeks (1250 km), the rider punctured through the rear tread whilst riding and the tyre deflated. The rider added 60 ml of Tyre Shot sealant via the valve stem, then used the tool to insert a plug into the puncture, and within 5 minutes the rider re-inflated the tyre using a $CO_2$ canister and continued riding. At 1330 km, the rider punctured through the front tread whilst riding and the sealant sealed the puncture however a plug was inserted into the puncture hole and 60 ml of Tyre Shot sealant added to reinforce the seal. Three more rear tyre punctures were repaired with plugs. The rider rode for 1500 km over a 5-week period after the first puncture repair. This demonstrates the longevity and strength of using the plug comprising a porous material.

Example 9—Head Portion and Scooter Tyre

An 8×8 mm square of 1.2 mm thick microfibre leather was glued (Zodiac 77127) halfway along a 72 mm length of PVC ribbon (2.5×0.85 mm) and cured. The plug was impregnated with accelerant. A 4.1/3.50—4 scooter tyre was mounted on a tubeless wheel and 60 ml Stans Tire Sealant added. The tyre was inflated to 15 psi and stabilized using the standard method. A 5.6 mm nail was pushed through the tread and removed whereupon the tyre deflated. The porous plug described above was folded in half such that the porous head was directly mounted on the end of the tool blade with the PVC ribbon folded in half around the outside. The head of the plug was fully inserted into the puncture using the tool, the tool was removed and the tails were withdrawn gently to seat the head firmly in the puncture hole. The wheel was rotated to allow the sealant to pool over the head for 30 sec and then inflated to 5 psi. The repair was inspected and some sealant exudate was observed. The tyre was then inflated and the tails were cut off flush with the tyre tread. The tyre remained usable and the puncture was repaired.

Example 10—Head Portion and Bicycle Tyre

A 50 mm length of 1.2 mm thick and 3 mm wide microfibre leather was glued (Zodiac 77127) halfway along a 100 mm length of PVC/nylon mesh laminate ribbon (8.0×1.15 mm) and cured to form a symmetrical cross shaped plug. The plug was impregnated with accelerant. A 26×2.25 Maxxis Ardent EXO TR tyre was mounted on a tubeless wheel and Stans tire sealant added to the internal cavity of the tyre. The tyre was inflated to 28 psi and stabilized using the standard method and ridden regularly for 2 weeks. A 13 mm cut was made in the tread of the inflated tyre which consequently deflated. A further 60 ml of Stans Tire Sealant was added into the tyre through the large puncture hole. The tyre plug with accelerant was folded in half and inserted into the puncture using a tool until the head portion including protrusions was entirely located inside the tyre. The tails of the plug were gently withdrawn to seat the plug head firmly in the puncture hole. The wheel was rotated to allow the sealant to pool over the puncture hole for 60 sec and the tails of the plug were held firmly to retain the plug and head in position. The tyre was inflated to 13 psi to apply pressure onto the repair site and some sealant exudate was observed from the puncture hole. After a further 120 seconds the tyre was inflated to 20 psi and the tyre was then left to stand for 10 minutes. The tails were cut off almost flush with the tyre tread surface and the tyre inflated to 26 psi. The wheel was mounted on a bike and ridden on mountain bike trails for 70 min. The pressure remained above 23 psi throughout. The tyre was submerged in a water bath and no air leaks were apparent through the repaired puncture. The tyre remained inflated and was ridden daily (30-90 minutes per ride) for a week, thereby demonstrating the large puncture was suitably repaired.

Example 11—Aerosol Sealant

A porous material (22×5×1 mm) as described in Example 5 was folded in half and placed into a flexible plastic sleeve then impregnated with accelerant. A 26×2.25 Maxxis Ardent EXO TR tyre was mounted on a tubeless wheel without sealant and inflated to 40 psi and stabilized using the standard method. The tyre was deflated to 28 psi and a 4.5 mm diameter nail was used to puncture a hole in the tyre and the tyre deflated. The plug with accelerant was inserted into the puncture using a tool. The wheel was rotated such that this repair was at the lowest point and then a commercial aerosol sealant (Espresso Doppio) was used to inflate the tyre. After addition of sufficient aerosol sealant and waiting a further 120 seconds the pressure was adjusted to 28 psi with air via a pump. The tyre was submerged in a water bath and no air leaks were apparent through the repaired puncture. The tyre remained inflated for several days and the puncture was suitably repaired.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A plug for sealing a puncture in a tyre, the plug comprising a head portion and an attached tail portion, the head portion comprising:
   a porous material that comprises open pores and is capable of absorbing >0.02 grams of water per gram of porous material with the porous material forming at least an exterior part of the head portion, wherein the porous material is selected from the group consisting of microfibre suede, bonded leather, PVC/polyester fabric, leather, microfibre leather, PVC/cotton mesh laminate, PVC/polypropylene mesh laminate, PVC/polyester mesh laminate, PVC/silk mesh laminate and PVC/nylon mesh laminate; and
   an accelerant selected from the group consisting of a salt, a polar solvent, an acid, and any combinations thereof, wherein the accelerant is retained in the pores of the porous material and is configured to react on contact with a curable sealant selected from the group consisting of anionic stabilized sealants, steric stabilized sealants and anionic colloidal dispersions thereby reducing curing time of the sealant, and wherein the porous material does not comprise the sealant.

2. The plug of claim 1, wherein the porous material is capable of absorbing >0.05 grams of water per gram of porous material.

3. The plug of claim 1, wherein the salt comprises a cation selected from the group consisting of calcium, zinc, magnesium and aluminium, and/or an anion selected from the group consisting of halide, sulfate, borate, nitrate, phosphate, phosphonate, silicate, thiocyanate, propionate and carboxylate.

4. The plug of claim 1, wherein the acid has a pH of less than 5.

5. The plug of claim 1, wherein the acid is selected from the group consisting of citric acid, etidronic acid, hydrochloric acid and sulphuric acid.

6. The plug of claim 1, wherein the polar solvent is selected from the group consisting of acetone, acetonitrile, phenoxyethanol, n-butanol, and isopropyl alcohol.

7. The plug of claim 1, wherein the sealant comprises chloroprene, natural rubber latex or styrene-butadiene latex.

8. The plug of claim 1, wherein the curable sealant is selected from the group consisting of polychloroprene latex, natural rubber latex, and styrene-butadiene rubber latex, and the accelerant is selected from the group consisting of $Ca(NO_3)_2$, $Ca(C_2H_5COO)_2$, $CaCl_2$, $ZnCl_2$, $MgCl_2$, $Al_2(SO_4)_3$, $AlCl_3$, acetone, acetonitrile, phenoxyethanol, n-butanol, isopropyl alcohol, citric acid, etidronic acid, hydrochloric acid, and sulphuric acid.

9. The plug of claim 1, wherein the tail portion comprises a non-porous material.

10. The plug of claim 1, wherein the tail portion comprises a second porous material or is formed from the same porous material, wherein the second porous material comprises open pores and the accelerant or the sealant is retained in the open pores of the second porous material.

11. A tyre comprising a puncture sealed by inserting the plug of claim 1 head first in the puncture, applying the curable sealant to the puncture such that the sealant comes into contact with the accelerant retained in the pores of the porous material to thereby reduce the curing time of the curable sealant, and curing the curable sealant, the tyre being selected from the group consisting of motorcycle tyres, all-terrain vehicle tyres, scooter tyres, skateboard tyres, cart tyres, bicycle tyres, wheelbarrow tyres, trailer tyres, automobile tyres, and tubeless tyres.

12. A kit for sealing a puncture in a tyre, the kit comprising the plug of claim 1 and the curable sealant.

13. The kit of claim 12, wherein the porous material is capable of absorbing >0.05 grams of water per gram of porous material.

14. The kit of claim 12, wherein the salt comprises a cation selected from the group consisting of calcium, zinc, magnesium and aluminium, and/or an anion selected from the group consisting of halide, sulfate, borate, nitrate, phosphate, phosphonate, silicate, thiocyanate, propionate and carboxylate.

15. A method of sealing a puncture in a tyre including the steps of:
  (i) providing the plug of claim 1;
  11 inserting the plug head first into the puncture;
  (iii) applying the curable sealant to the puncture such that the sealant comes into contact with the accelerant retained in the pores of the porous material to thereby reduce the curing time of the curable sealant; and
  (iv) curing the curable sealant to thereby seal the puncture in the tyre.

16. The method of claim 15 further comprising the step of inflating the sealed tyre.

* * * * *